(No Model.)

J. W. KETCHAM.
RE-ENFORCING BAND FOR SPARS.

No. 314,535. Patented Mar. 24, 1885.

Witnesses:
E. C. Perkins
J. S. Acker Jr.

Inventor:
J. Wesley Ketcham
By David A. Burr
Attorney

UNITED STATES PATENT OFFICE.

J. WESLEY KETCHAM, OF GREENPORT, ASSIGNOR OF ONE-HALF TO CARLISLE J. BISHOP, OF ORIENT, NEW YORK.

RE-ENFORCING BAND FOR SPARS.

SPECIFICATION forming part of Letters Patent No. 314,535, dated March 24, 1885.

Application filed September 11, 1884. (No model.)

*To all whom it may concern:*

Be it known that I, J. WESLEY KETCHAM, of Greenport, in the county of Suffolk and State of New York, have invented a new and useful Improvement in Re-enforcing and Coupling Bands for Repairing and Strengthening Spars, &c.; and I do hereby declare that the following is a full and exact description thereof, reference being had to the accompanying drawings, and to the letters of reference marked thereon, making a part of this specification.

My invention relates to the repair of broken spars, masts, posts, &c., by "fishing" the joint or weak spot therein, and has for its object the provision of ready means for accomplishing this end, and of securing the utmost strength in the job.

It consists of a series of strips, adapted to be laid longitudinally over the joint or weak spot in the spar, hinged together, so as to form a flexible band to be wrapped about the spar, and to be clamped and bound up tightly thereon by bolts passing through suitable eyes in the opposite free edges of the band. By preference metallic plates are secured transversely upon the outer face of each strip, and the strips are united side by side by hinging these plates together to constitute endless bands or chains of pivoted links supporting and carrying the strips upon their inner faces.

Figure 1:
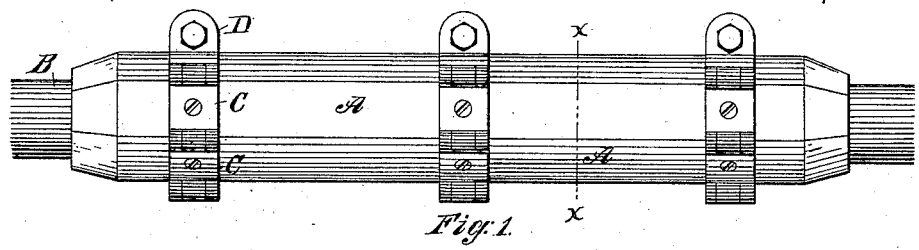
Figure 2:
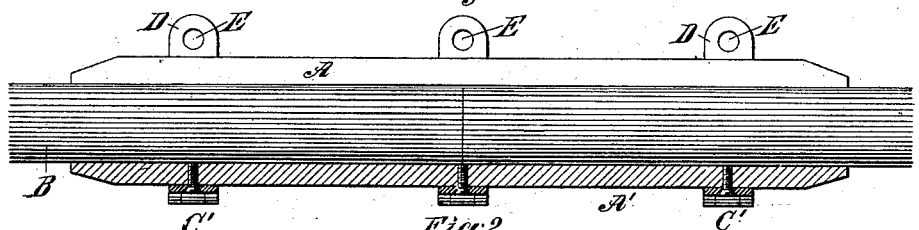
Figure 3:
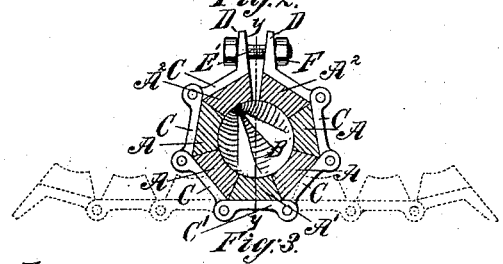
Figure 4:
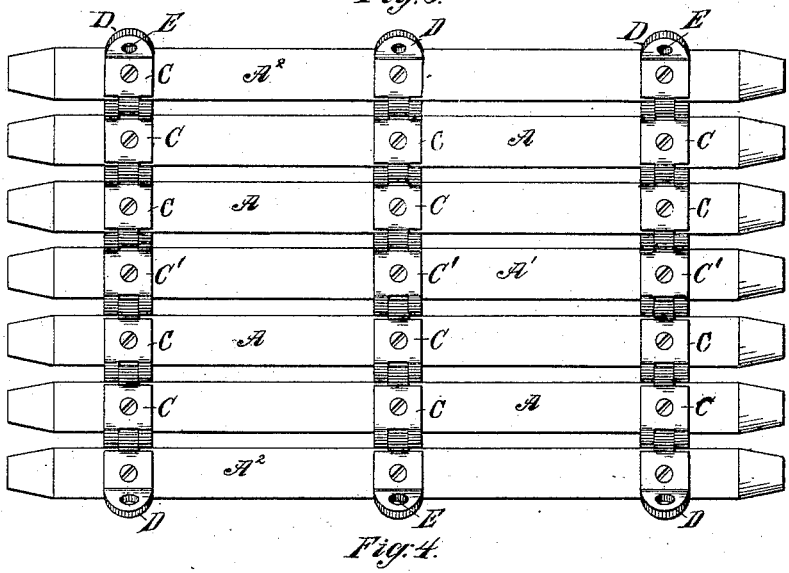

In the accompanying drawings, Figure 1 is an elevation of my improved coupling or fishing band as applied for the repair and re-enforcement of a broken spar; Fig. 2, a longitudinal section of the same; Fig. 3, a transverse section in line *x x* of Fig. 1, and Fig. 4 a plan view of the outer side of the re-enforcing band when opened out.

A A A represent a series of narrow strips of wood or metal, preferably of equal width, adapted to fit longitudinally upon a spar or stick, B, and such as are commonly used for fishing broken spars by being bound thereon with a wrapping of strong cord or wire.

C C represent metallic plates, each of a length corresponding to the width of the several strips. These plates are made to hinge together at their ends, the hinge being constructed in any suitable manner having proper strength, and are thus united to form flexible chains, (see Figs. 3 and 4,) each of such length as may be required to encircle the spar or stick to be bound. These chains are readily adjusted in length, to adapt them to any special piece of work, by adding to or removing from the number of the plates or links C C included therein, the hinges of the outer links being provided for this purpose with detachable pins, admitting of ready removal or replacement. By preference the middle plate in each chain is made with double ears at each end, (see at C, Figs. 3 and 4,) the remaining plates being made with a single ear at one end and double ears at the other; hence the two outermost ends of the chains are made to correspond.

An angular plate, D, provided with a bolt-hole, E, therein, and which is so bent as that the section through which the hole E is pierced shall project outward radially when the chain is led around the circumference of a spar, is hinged to each end of each chain, so that by passing a threaded bolt, E', Fig. 3, through the holes in the end plates, when they are brought into register by lapping the chain around a spar the two ends of the chain may be drawn together to clamp it tightly about the spar by screwing up a nut, F, upon the bolt, as shown in Fig. 3. The strips A A are each riveted transversely to the inner side of the corresponding plates, C C, on two or more of these chains, so as to be united thereby side by side to constitute a slatted hinged band, inflexible in the direction of its length, which is determined by the length of the strips, but which yields readily transversely in the direction of its width, so as to admit of being readily wrapped about the circumference of a spar or stick of timber. The width of this band is determined by the number of strips inserted between the central strip, A', and the two outer strips, $A^2 A^2$. As each strip is separately secured to detached plates C C, adapted to form links in the chains, and which, by means of loose hinge-pins, are readily inserted as a part of the chains, the expansion or contraction of the band to suit spars or sticks of different diameters is readily accomplished by the addition or removal of one or more of the strips.

In use the slatted band is carried around the adjacent ends of a broken spar or stick, so as to break and cover the joint between them, (see Fig. 2,) and the ends of the chains, after being brought together and united by bolts led through the apertures in the outer plates, D D, are drawn up, so as to firmly secure and clamp the strips upon the spar by means of the nuts upon the bolts. (See Fig. 3.) When thus made tight, the band will so re-enforce the spar and so hold its separate ends together as to render the same practically as stiff and strong at this point as when it was unbroken, or even more so.

It is evident that the special construction of the hinges uniting the plates by which the strips A A are bound together may be varied without departing from my invention, and also that special devices may be substituted for single-threaded bolts, for the purpose of closing and drawing up the band of strips upon the spar, and that the band may be of any length as best adapted to the work for which it may be specially designed.

I am aware that separate loose independent strips have been commonly used for fishing broken spars by binding them upon the same to cover the joint and securing them by a wrapping of cords or ropes.

I claim as my invention—

1. A transversely-flexible and longitudinally-rigid clamping-band for fishing and re-enforcing weak or broken spars or sticks of timber, constructed of a series of narrow strips or slats hinged together laterally, substantially in the manner and for the purpose herein set forth.

2. A series of narrow clamping and re-enforcing strips, each fitted with two or more transverse hinge-plates adapted to interlock and form, in the construction of an adjustable clamping-band, a lateral hinged connection, with counterpart plates upon the other corresponding strips, substantially in the manner and for the purpose herein set forth.

In testimony whereof I have signed my name to this specification in the presence of two subscribing witnesses.

J. WESLEY KETCHAM.

Witnesses:
WM. H. DRAKE,
A. B. MOORE.